United States Patent Office.

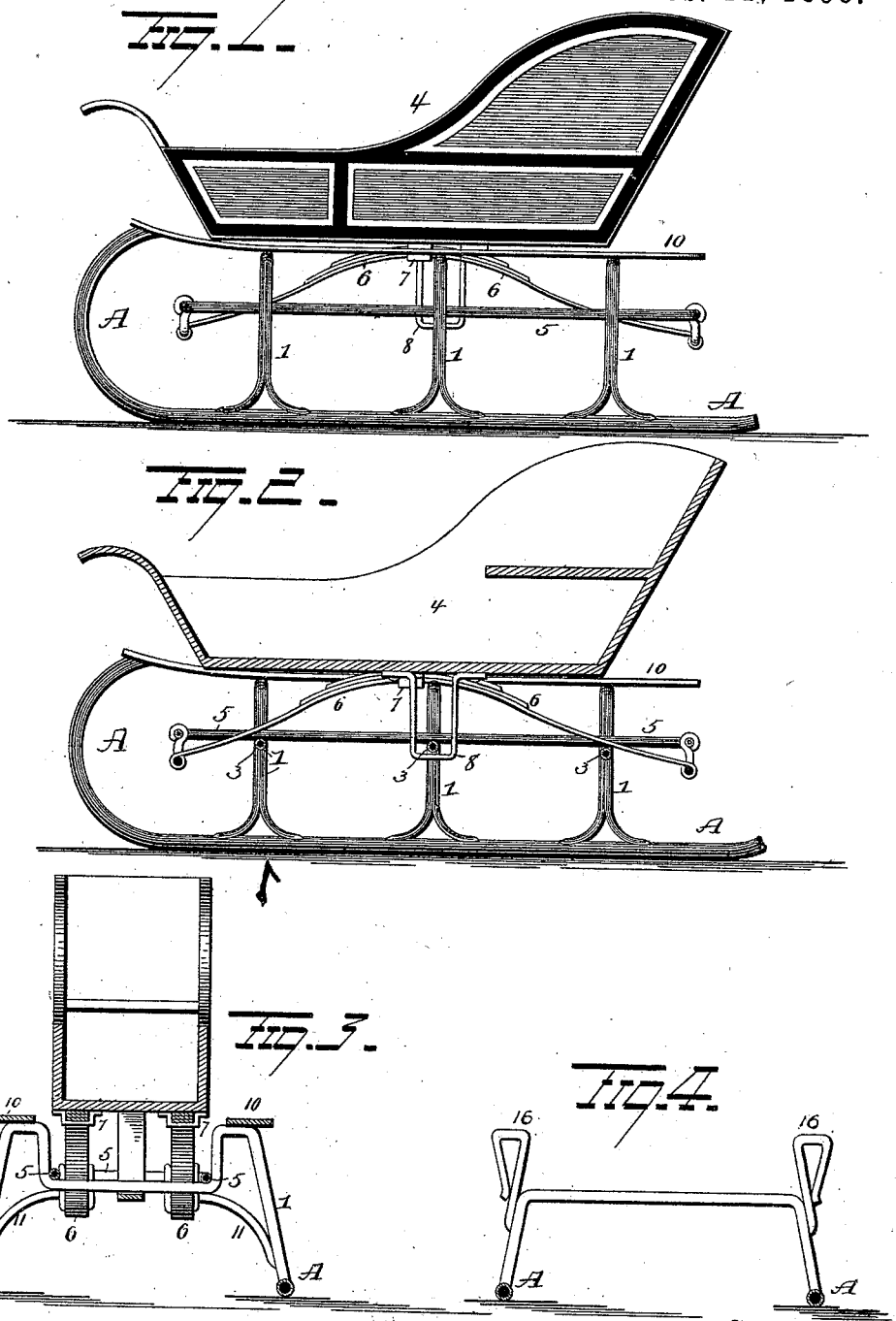

GEORGE W. WILLIAMS, OF ADAMS, NEW YORK, ASSIGNOR OF ONE-HALF TO HENRY COWAN, OF BOSTON, MASSACHUSETTS.

SLEIGH.

SPECIFICATION forming part of Letters Patent No. 554,328, dated February 11, 1896.

Application filed May 31, 1895. Serial No. 551,260. (No model.)

*To all whom it may concern:*

Be it known that I, GEORGE W. WILLIAMS, of Adams, in the county of Jefferson and State of New York, have invented certain new and useful Improvements in Sleighs; and I do hereby declare the following to be a full, clear, and exact description of the invention, such as will enable others skilled in the art to which it appertains to make and use the same.

My invention relates to an improvement in sleighs; and it consists in certain novel features of construction and combinations of parts, as will be hereinafter more fully described, and pointed out in the claims.

In the accompanying drawings, Figure 1 represents a view of my improvement. Figs. 2 and 3 are sectional views of the same, and Fig. 4 is a view of a modified construction.

A represents the runners, and 1 1 1 are the runner-supports, which latter are preferably constructed of tubular iron and rigidly connected to said runners in the usual manner. Each of said supports is centrally depressed, as shown at 3, such depressions constituting a recess within which is supported the sleigh-body 4. Within this recessed center is secured an oblong frame 5, the ends of which project a suitable distance beyond the front and rear supports 1 and are adapted to receive and support the semielliptic springs 6, which latter are centrally secured to the body 4, as shown at 7. Depending centrally from the bottom of body 4 is a U-shaped projection 8, through which passes the depressed portion of central support 1, said depression 3 acting as a stop whereby the upward movement of the sleigh-body is limited.

Secured to runners A and top faces of supports 1 are the guards 10, which latter also constitute steps whereby the entrance to and exit from the sleigh-body are rendered easy.

The entire sleigh, with the exception of body 4 and springs, can be made of tubular pipe, and when so constructed a light, strong, and neat gear is obtained. By depressing runner-supports 1, as shown at 3, it will be seen that the body 4, although supported on springs, is no higher from the ground than is the case where the body is rigidly attached to the runners, and hence with my improved construction we have the advantage of a yielding body and at the same time one that is no higher from the ground than the one in common use.

The rear runner-support 1 is provided with braces 11 11, by means of which spreading of runners A at this point is obviated.

In the modification shown in Fig. 4 the supports are not depressed, as in Fig. 1, but extend from side to side in a horizontal plane. Attached to the supports at the sides are brackets 16, which extend upwardly and form rests for the guards 10. By this arrangement a central depression is formed within which the sleigh-body is free to rise and fall. This depression can be formed in numerous ways, and hence I would have it understood that changes in the construction and relative arrangement of the several parts might be made without avoiding my invention.

Having fully described my invention, what I claim as new, and desire to secure by Letters Patent, is—

1. The combination, in a sleigh, with a pair of runners, supports connecting the runners, and an oblong frame secured to said supports, of a body portion, and springs supported on the oblong frame and to which the body portion is secured, substantially as set forth.

2. As a new article of manufacture, a sleigh, consisting of a pair of runners, supports connecting said runners, said supports being centrally depressed so as to form a recess, an oblong frame secured within said depressed recess and means carried by the sleigh-body for yieldingly connecting said body to the oblong frame, substantially as set forth.

In testimony whereof I have signed this specification in the presence of two subscribing witnesses.

GEORGE W. WILLIAMS.

Witnesses:
HENRY COWAN,
C. L. LAWRENCE.